US012013543B2

(12) United States Patent
Baudou et al.

(10) Patent No.: US 12,013,543 B2
(45) Date of Patent: Jun. 18, 2024

(54) HELMET-MOUNTED DISPLAY SYSTEM COMPRISING A DEVICE FOR ALIGNING AND RETRACTING THE DISPLAY DEVICE

(71) Applicant: THALES, Courbevoie (FR)

(72) Inventors: Joël Baudou, Merignac (FR); Mathieu Balet, Merignac (FR); Bruno Aymeric, Merignac (FR)

(73) Assignee: THALES, Courbevoie (FR)

( * ) Notice: Subject to any disclaimer, the term of this patent is extended or adjusted under 35 U.S.C. 154(b) by 458 days.

(21) Appl. No.: 17/422,787

(22) PCT Filed: Dec. 18, 2019

(86) PCT No.: PCT/EP2019/086056
§ 371 (c)(1),
(2) Date: Jul. 14, 2021

(87) PCT Pub. No.: WO2020/160826
PCT Pub. Date: Aug. 13, 2020

(65) Prior Publication Data
US 2022/0128822 A1  Apr. 28, 2022

(30) Foreign Application Priority Data
Feb. 7, 2019 (FR) ...................................... 1901163

(51) Int. Cl.
*G02B 27/01* (2006.01)
*A42B 3/04* (2006.01)

(52) U.S. Cl.
CPC .......... *G02B 27/0176* (2013.01); *A42B 3/042* (2013.01); *A42B 3/0453* (2013.01); *G02B 2027/0156* (2013.01); *G02B 2027/0159* (2013.01); *G02B 2027/0178* (2013.01); *G02B 2027/0181* (2013.01)

(58) Field of Classification Search
CPC ........ G02B 27/0176; A42B 3/042; A42B 3/04
See application file for complete search history.

(56) References Cited

U.S. PATENT DOCUMENTS

| 2010/0091377 A1* | 4/2010 | Hedges | ..................... A42B 3/04 |
| | | | 359/630 |
| 2012/0120482 A1 | 5/2012 | Hedges et al. | |

FOREIGN PATENT DOCUMENTS

| EP | 0 671 646 A1 | 9/1995 |
| GB | 2 062 285 A | 5/1981 |

(Continued)

*Primary Examiner* — Ryan D Howard
(74) *Attorney, Agent, or Firm* — BakerHostetler (57) ABSTRACT

A helmet-mounted display systems includes a front mechanical arch comprising a display device and a means for holding and adjusting the display device in the vertical plane, the means consisting of a first vertical support surface comprising an oblong port and a screw/spring assembly, the screw passing through the oblong port and being fastened in a mechanical structure of the display device, the display device being capable of rotating in such a way as to make it retractable. The display system comprises a means for roll adjustment and repositioning of the display device, the adjustment means consisting of a second vertical support surface, normal to the first support surface, and a knurl screw attached to the mechanical structure of the display device, the end of the screw resting on the second support surface when the display device is in the use position.

9 Claims, 5 Drawing Sheets

(56) References Cited

FOREIGN PATENT DOCUMENTS

| WO | 2010/045141 | A1 | 4/2010 |
| WO | 2014/186682 | A1 | 11/2014 |
| WO | 2016/174355 | A1 | 11/2016 |

* cited by examiner

HELMET-MOUNTED DISPLAY SYSTEM COMPRISING A DEVICE FOR ALIGNING AND RETRACTING THE DISPLAY DEVICE

CROSS-REFERENCE TO RELATED APPLICATIONS

This application is a National Stage of International patent application PCT/EP2019/086056, filed on Dec. 18, 2019, which claims priority to foreign French patent application No. FR 1901163, filed on Feb. 7, 2019, the disclosures of which are incorporated by reference in their entirety.

FIELD OF THE INVENTION

The technical field of the invention is that of the helmet-mounted display systems for airplane or helicopter pilots. It applies more particularly, but not exclusively, to the field of the display devices with pupil expansion combiner.

BACKGROUND

A display system essentially comprises a display device and a helmet position detection device.

The function of the display device is to provide the user with a collimated image overlaid on the outside landscape. The overlay is provided by an optical element called combiner. That can feature pupil expansion.

The display device that is worn must be as light and as small as possible so as not to degrade the comfort of the pilot and facilitate its incorporation on the head. One way of lightening the optic is to reduce the zone in which all of the image is visible, known by the term "eye-box". Generally, the minimum dimension of the eye-box is approximately 10 millimeters by 10 millimeters in order to incorporate the diameter of the pupil, which can exceed 5 millimeters in low brightness, and the movement thereof when the user looks at the edges of the image, typically the center of the pupil describes a circular arc of 5.2 millimeters for a 30° sight.

This eye-box dimension is insufficient to guarantee that the eye is sufficiently well centered therein to see all of the image. In fact, the distance between the two eyes of the user varies by approximately 54 to 72 millimeters in the horizontal plane and the pupil-vertex height varies by approximately 100 to 130 millimeters in the vertical plane. To these anthropometric variations, there must be added the helmet form and size variations, the defects of initial positioning of the helmet or of the holding device on the head and the possible slipping thereof in flight.

To overcome these differences between the dimension of the eye-box and the morphological variations, the display device generally has adjustments in the vertical direction and in the horizontal direction. These adjustments can be made by means of slides driven by knurled screws as in the night-vision devices or simply by sliding the support surface of the display device over the receiving surface on the helmet, the hold being ensured, for example, by a tightening screw through a hole with play corresponding to the desired adjustment travel.

The position detection device has a number of uses. It makes it possible to realign the image displayed by the display device. It makes it possible to servocontrol a certain number of systems embedded on the aircraft, such as certain imaging sensors or certain armament systems. For example, in the case of augmented reality applications, to display a horizon line or a synthetic landing runway, the synthetic image must be overlaid on the real image with great accuracy.

The posture detection device is installed on the helmet and determines the position of the helmet with respect to the aircraft and with respect to the Earth by virtue of optical, magnetic or inertial references incorporated in the cockpit. This information is transmitted to a computer which modifies the image presented as a function of the posture of the helmet and which transmits it to the display device.

To obtain the overlay of the synthetic image, the image must be corrected of the relative position between the posture detection and the display and notably take account of the real position after adjustment. The accuracy of overlay of the synthetic image on the outside world, generally situated at several tens of meters, depends mostly on the accuracy of determination of the angles of the display device with respect to the posture detection device.

Ideally, the display device also incorporates the position detection device, so the relative position is known and determined in manufacture and there is no variation with the adjustment of the position of the display in front of the eye. For example, most augmented reality glasses implement a solution of this type, that is not bulky but also not very accurate.

However, on a helmet, the space requirements of the display device and of the posture detection device, as well as the disposition of the references of the cockpit, do not generally allow these two devices to be associated. It is therefore necessary to make adjustments.

The vertical and horizontal adjustment of the display device by slides has significant weight and bulk. For example, the slides of the type of those which exist to ensure the adjustments of the night vision goggles are not very accurate, not very rigid and they have too much play.

The mechanical structure linking the display device to the posture detection device is generally made of plastic or composite material and is insufficiently rigid to ensure the accuracy of a few milliradians required for the alignment of the synthetic image on the real image.

There are micro-electromechanical devices used as angle sensors which can be incorporated in each of the devices in order to determine their relative position, but they require wiring and additional processing, as well as regular calibration, which increases the complexity of the system.

Moreover, in the case of a display device with combiner or with pupil expansion plate, the combiner or the complete device needs to be able to be disengaged from the face in order to be able to fit and remove the helmet. This additional mechanism should not affect the accuracy of overlay.

Figure 1:
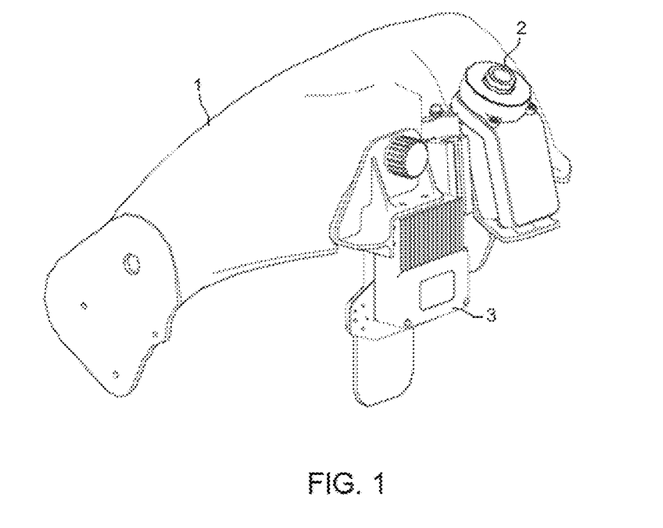
FIG. 1 represents a perspective view of a helmet-mounted display system according to the prior art.

To resolve this problem of adjustment and of accuracy, various technical solutions have been proposed. The patent US2012120482 entitled "Modular day mode/night mode helmet-mounted display" presents a helmet-mounted display system which does not exhibit the abovementioned drawbacks. A perspective view of this system produced according to the patent US2012120482 is represented in FIG. 1. The same view is represented exploded in FIG. 2 so as to better see certain elements.

Figure 2:
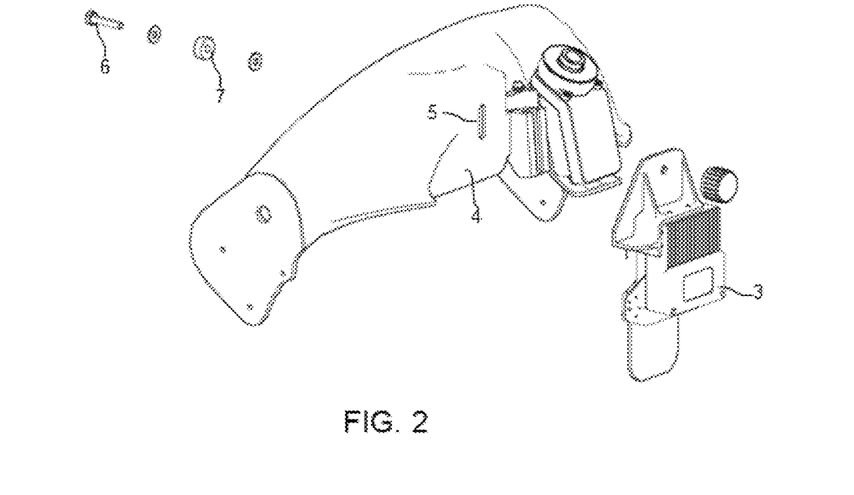
FIG. 2 represents an exploded perspective view of the helmet-mounted display system of FIG. 1.

This display system consists of a helmet whose visor is removed and replaced by a mechanical structure 1 made of composite material receiving the posture detection device 2 on the left and the display device 3 in front of the right eye of the user.

The link between the display device and the mechanical structure consists of a vertical surface 4 comprising an oblong port of vertical axis 5 passed through by a screw 6 which compresses a spring 7 ensuring the friction force necessary to hold the display device in position. The screw 6 slides in the oblong port 5 for the vertical alignment of the display device 3 in front of the eye. The display device 3 pivots about the axis of the screw 6 to ensure its lateral alignment or the disengagement thereof.

The realignment of the synthetic image is performed by sighting a harmonized reference with the aircraft. This alignment reference is produced by a glass comprising a collimated pattern, known by the acronym "BRU", standing for "Boresight Reference Unit".

The realignment of the synthetic image is then performed by the pilot who moves the synthetic image vertically, horizontally, and by rotation, until the overlay of the synthetic image on the harmonized pattern is obtained.

The vertical and horizontal alignment compensates for the deformation of the mechanical structure supporting the display device and the position detection device mounted on the helmet and any deformations of the helmet placed on the head. The alignment by rotation or by roll also compensates for the deformations of the mechanical structure and the rotational alignment of the display device centered horizontally in the eye-box.

This operation is performed in the maintenance mode of the display device and must be performed each time the system is started up. Likewise, after each manipulation of the display device on the head, the pilot must repeat the image rotation because there is no mechanism for memorizing the initial position.

In another alignment mode, the collimated pattern is replaced by a camera attached to the aircraft which renders a video image of the outside world in the display device. The alignment procedure then consists in overlaying the video image on the outside image seen through the combiner. This principle has the advantage of not requiring the operation of harmonization of the reference with the aircraft but the alignment in flight is difficult and less accurate than on the ground. This alignment mode therefore requires a memorization of the setting of the adjustment of the display device.

SUMMARY OF THE INVENTION

The helmet-mounted display system according to the invention does not present the above drawbacks. It comprises a device for aligning and retracting the display device that is sufficiently reliable and accurate to be put back in place without requiring mechanical or optical realignment. Furthermore, this mechanical device is simple, lightweight and not bulky.

More specifically, the invention relates to a helmet-mounted display system comprising a helmet shell and a mechanical arch mounted on the front part of said shell, the mechanical arch comprising:
a fixed position detection device;
a display device;
a means for holding and adjusting the display device in the vertical plane, said holding and adjustment means consisting:
of a first vertical support surface disposed in the front part of the arch and at right angles to the sagittal plane of the shell, said flat support comprising an oblong port;
of a screw-spring assembly which ensures the fixing and the adjustment of the display device on the flat support, the screw passing through the oblong port and being fixed in a mechanical structure of the display device, the display device being able to rotate with friction about the axis of the screw so as to make it retractable;

characterized in that the display system comprises a means for roll adjustment and repositioning of the display device, said adjustment and repositioning means consisting:
of a second vertical support surface, normal to the first support surface;
of a knurled screw with spherical end attached to the mechanical structure of the display device, the axis of the knurled screw being at right angles to the screw-spring axis and in a horizontal plane, the end of the screw resting on the second support surface when the display device is in its position of use.

Advantageously, the mechanical arch comprises an electrical system for detecting contact of the knurled screw with the second support surface.

Advantageously, the mechanical arch comprises a mechanical system for locking the knurled screw on the second support surface.

Advantageously, the mechanical arch comprises a magnetization-based system for locking the knurled screw on the second support surface.

Advantageously, the display device comprises an optical combiner with pupil expansion.

Advantageously, the position detection device is a camera optical device.

Advantageously, the helmet-mounted display device comprising a display, the helmet-mounted display system comprises a graphic computer comprising a function for dimensioning the size of the image as a function of the inclination of the display device when the latter is in its position of use.

Advantageously, the display system comprises a movable visor mounted on the mechanical arch, said visor covering the display device in lowered position and being situated on the top of the shell in raised position.

Advantageously, the mechanical arch comprises fixing means for a binocular support.

BRIEF DESCRIPTION OF THE DRAWINGS

The attached drawings illustrate the invention.

DETAILED DESCRIPTION

The display system according to the invention essentially comprises a helmet shell 15 and a mechanical arch 10 mounted on the front part of this shell 15.

Figure 3:
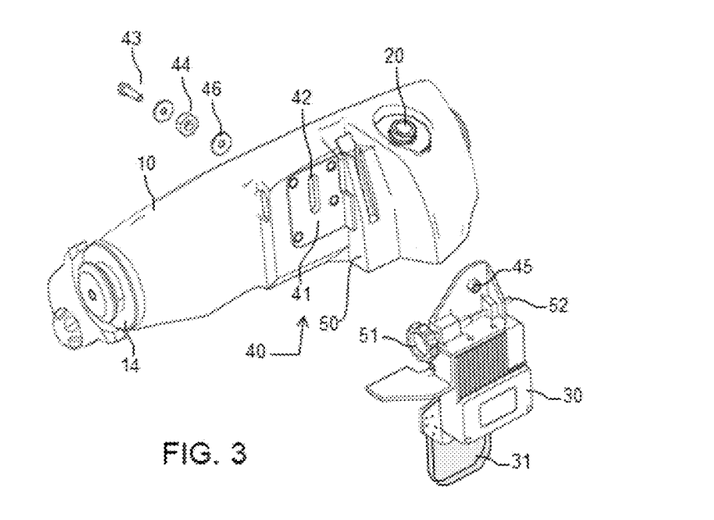
FIG. 3 represents an exploded perspective view from the front of the mechanical arch and of the associated display device according to the invention.
Figure 4:
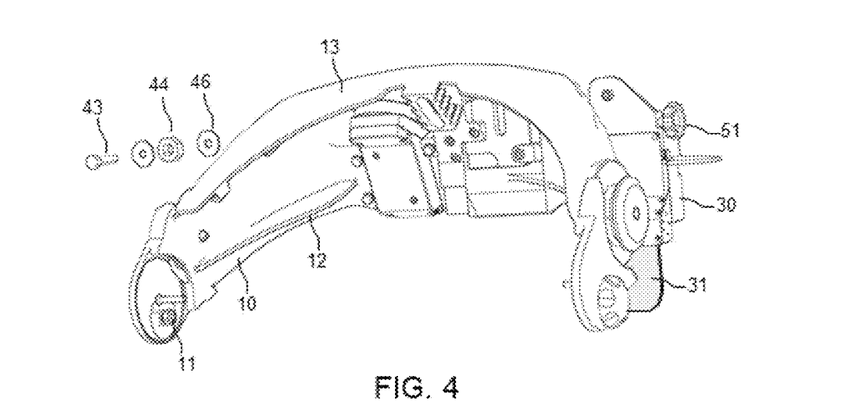
FIG. 4 represents an exploded perspective view of the back of the mechanical arch and of the associated display device according to the invention.
Figure 5:
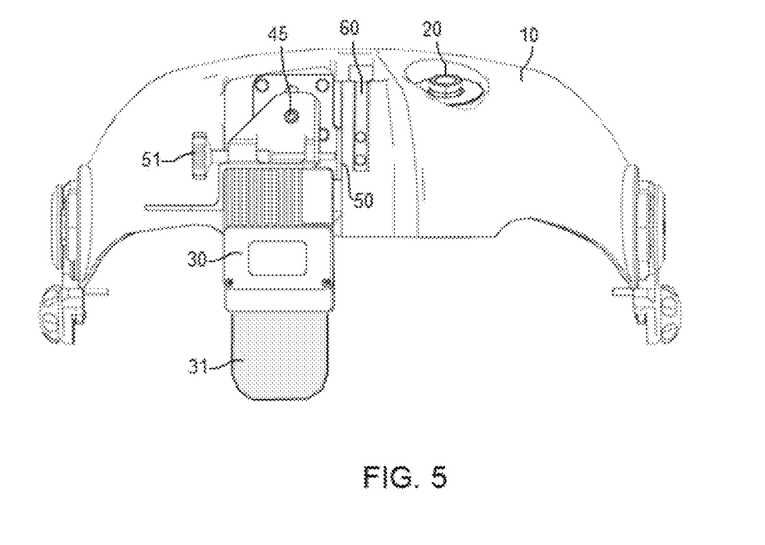
FIG. 5 represents a front view of the mechanical arch and of the associated display device according to the invention.

By way of example, FIGS. 3 and 4 represent two perspective views of this mechanical arch 10. FIG. 5 represents a front view of this same arch. The general form of this arch 10 is a circular arc reinforced by spars 12 and a top cap 13.

This arch comprises the following elements:
means 11 for fixing onto the shell of the helmet;
means 14 for fixing and articulating the movable visor 16;
a position detection device 20;
a display device 30;
a first mechanical assembly 40 for fixing and adjusting the display device;
a second mechanical assembly for adjusting and repositioning the display device;
a fixing means for a binocular support 60;
a movable visor 16.

The two means 11 for fixing on the shell of the helmet are situated at the two ends of the arch as can be seen, for example, in FIG. 4.

The two means 14 for fixing and articulating the movable visor 16 are situated at a few centimeters from and above and in front of the fixing means 11. The visor 16 is movable by rotation about its axes. The movable visor has a dual function of visual and mechanical protection.

The position detection device 20 has a number of uses. It makes it possible to realign the image displayed by the display device. It makes it possible to servocontrol a certain number of systems embedded on the aircraft, such as certain imaging sensors or certain armament systems.

By way of example, this device is a wide-field and high-resolution microcamera which detects specific patterns disposed at known locations in the cockpit. The position and the orientation of the image of these patterns makes it possible to determine the position and the orientation of the camera and, consequently, of the helmet on which the camera is mounted. Obviously, the display system according to the invention is not limited to just this type of position detection.

It is essential for the mechanical link between this detection device is the display device to be as rigid as possible so that the position of the helmet determined by the camera is always representative of the position of the display device.

The arch can also comprise a fixing means 60 for a binocular support. It is represented in particular in FIGS. 3 and 5. In these figures, this fixing means is a T-shaped groove disposed in the mechanical structure of the arch. Other dispositions are possible.

The display device comprises three main parts which are a display device, a collimation optic and an optical combiner. By way of example, the display device comprises a flat screen with its lighting source and its electronic driver board. The projection optic ensures the collimation of the diffused image. The combiner overlays this image on the outside landscape. It generally features pupil expansion.

A combiner with pupil expansion is a thin optical plate with flat and parallel faces in which a plurality of inclined and mutually parallel semi-reflecting plates is inserted. The thickness of the combiner is a few millimeters. By virtue of this disposition, it is possible to obtain, within a reduced bulk, a pupil of sufficient dimensions for observation. The distance separating the combiner from the eye is of the order of 25 millimeters.

The first mechanical assembly 40 for fixing and adjusting the display device has a triple function. It makes it possible to hold the display device on the mechanical arch. It ensures the adjustment in vertical translation of the display device and allows the retraction of the display device by rotation.

It comprises a vertical flat support 41 comprising an oblong port 42 that are disposed in the mechanical structure of the arch. The vertical support 41 is substantially parallel to the vertical plane as seen through the two eyes of the user and is normal to the sagittal plane. In that way, the movements of the display device cause only a single angular offset to be compensated which is the roll of the synthetic image.

The display device is held in position by adherence by virtue of a spring 44 compressed by the screw 43 onto an internal surface parallel to the vertical support 41 of the mechanical structure. The display device 30 is guided precisely in its movement in the oblong port 42, both in translation and in rotation, by virtue of an adjustment of the cylindrical boss 45 associated with the display device with a small play in the oblong port 42. The play is, for example, of the H7g6 type as per the ISO mechanical adjustment standards.

The friction force is adjusted by the tightening of the screw 43 and the compression of the spring 44 so that the movement of the display device 30 can be obtained by one hand. In this case, the spring 44 consists of conical washers mounted in series so as to reduce the bulk and the weight of the spring 44. The force of the spring 44 on the structure is distributed over a wide surface by virtue of a washer 46 on the internal face of the vertical surface 41 and the bearing of the display device on the outer face of this same vertical surface 41.

The friction coefficient of the materials of the mechanical structure and of the display device and the surfaces in contact allow an oscillation of the display device about the axis of its boss 45 without modifying the vertical adjustment of the display device 30 when the pilot actuates the display device by holding it by the bottom end of the optical combiner 31. A vertical offset of less than 1 millimeter in the rotation of the display device is tolerable because it does not cause any loss of image, the eye being still within the eye-box, and does not modify the angular position of the display device.

The roll adjustment producing the horizontal or lateral centering of the eye-box of the display device in front of the eye of the pilot is adjusted using a fine-pitch knurled screw 51 attached to the display device 30 and in abutment on a vertical surface 50 normal to the support surface 41 of the mechanical structure of the arch and parallel to the oblong port 42. The end 52 of the abutment screw 51 is spherical so as to control the zone of contact of the screw 51 on the surface 50 upon the rotation thereof about its axis and about the pivot 45 of the display device, and avoid the wear of the vertical surface 50 by the thread burrs.

The vertical adjustment and the lateral adjustment of the display device are thus independent. The vertical readjustment in flight does not modify the roll adjustment as long as the abutment screw 51 is in contact with the surface 50. Likewise, the repositioning of the display device after removal from the face remains true as long as this abutment screw 51 is in contact with the surface 50.

The angular precision of the roll adjustment depends on the play between the boss 45 and the oblong port 42 and on the distance of the abutment screw 51 with respect to the boss 45. The play therefore be minimized and the distance maximized.

The holding of the abutment screw 52 in contact against the vertical surface 50 is therefore fundamental. In a first embodiment, it is obtained by friction and adherence between the display device and the mechanical structure of the arch on the surface 50.

In a second embodiment, this contact can be ensured by a complementary mechanical device.

As a first example, this complementary device can be a retractable locking of the abutment screw 52 on the vertical surface. The spherical end of the abutment screw is locked against the vertical surface by a floating spring. This spring is separated by the spherical form of the screw upon the pivoting to disengage the display device.

As a second example, this complementary device is produced by a bistable pivot 45. The pivot is decoupled from the vertical translation adjustment and a torsion spring ensures the contact of the abutment screw against the vertical surface. The disengaged position of the display device is ensured by a retractable locking finger.

The spring and the locking finger can be replaced by magnets situated on the vertical surface 50 and on the disengaged position abutment of the display device.

It is also possible to arrange a means for checking the contact between the abutment and its support surface. For example, the detection of the contact can be ensured by an electrical signal. The abutment screw 51 and the vertical surface 50 are then electrical conductors and a signal is transmitted to the system which displays the information in the display device when the contact is cut and/or made.

The abutment screw 51 is knurled and easily accessible to facilitate the adjustment when the display device displays a synthetic image to assist in the centering of the eye-box on the eye of the pilot.

The height between the pivot produced by the boss 45 and the eye is as great as possible in order to limit the amplitude of the image roll correction of the display device 30 which is dependent on the inter-pupil distance. This height is limited by the proximity with the visor of the helmet and its raising kinematics.

During the adjustments, the low amplitude of the rotation of the display device makes it possible to retain the greatest possible part of the rectangular field of the synthetic image. In fact, the synthetic image is composed of symbols linked to the display in the head reference frame and of symbols or video images linked to the outside world in the terrestrial reference frame. When a strong inclination of the display device 30 occurs, the size of the synthetic image is redimensioned in order for its outlines not to disrupt the perception and the orientation of the head. This point is illustrated in the three diagrams of FIG. 6.

Figure 6:
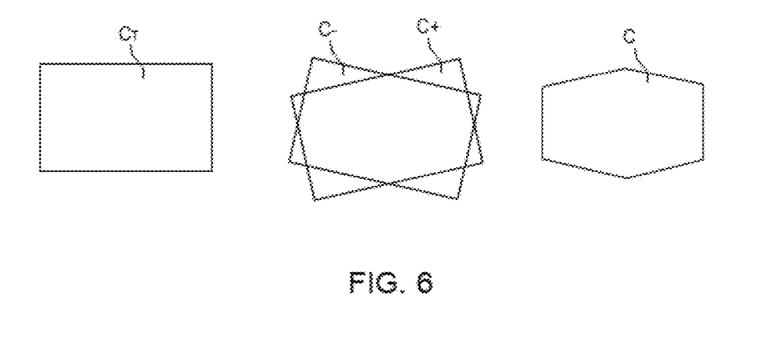
FIG. 6 represents the principle of dimensioning of the synthetic image displayed in the display device.

The first diagram, on the left of FIG. 6, represents the total field $C_T$ of the display of the display device. The second diagram, at the center of FIG. 6, represents the minimum and maximum inclinations of this display when the display device is inclined by means of its knurled screw to the left or to the right so as to compensate for the differences between the inter-pupil distances of the users. These fields are denoted C− and C+. The useful field C of the image on the display needs to allow a straight image to be displayed for these extreme fields. It is therefore at best equal to the intersection of the two fields C− and C+. It is represented by a hexagon on the diagram on the right of FIG. 6.

Figure 7:
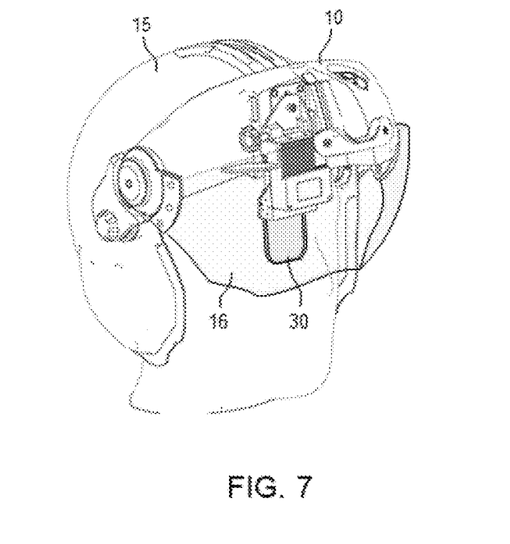
FIG. 7 represents a front perspective view of the display system according to the invention mounted on a helmet, the visor being lowered.
Figure 8:
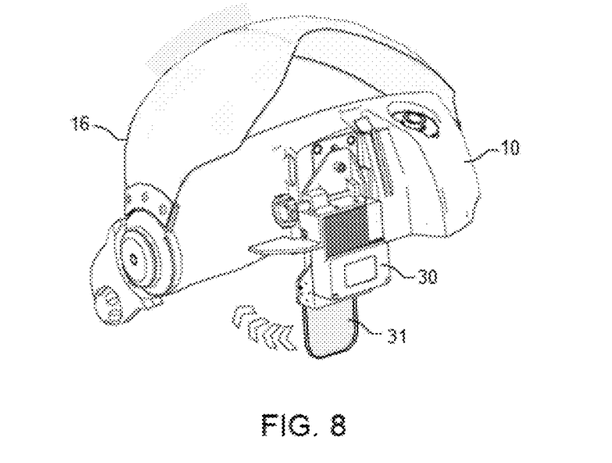
FIG. 8 represents a front perspective view of the display system according to the invention mounted on a helmet, the visor being raised, the display device being in functional position.
Figure 9:
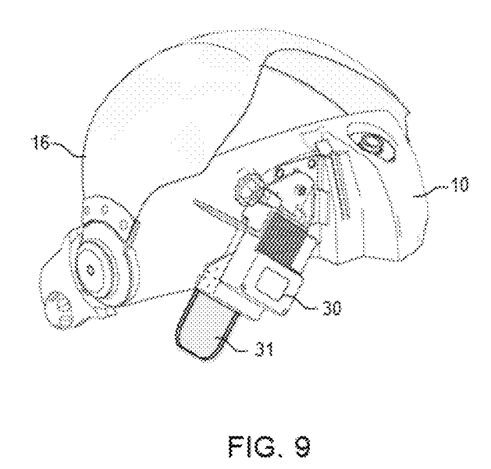
FIG. 9 represents a front perspective view of the display system according to the invention mounted on a helmet, the visor being raised, the display device being in retracted position.

FIGS. 7, 8 and 9 respectively represent:
a first front perspective view of the display system according to the invention mounted on a helmet, the visor being lowered;
a second front perspective view of the display system mounted on a helmet, the visor being raised, the display device being in functional position;
a third front perspective view of the display system according to the invention mounted on a helmet, the visor being raised, the display device being in retracted position.

The display system according to the invention offers numerous advantages. It makes it possible to easily retain the lateral adjustment of the display device so as to reposition it in its initial position with the eye centered in the eye-box by virtue of the addition of the adjustable abutment.

The weight added to the helmet by the additional adjustment means is very small and the bulk of the display device is not substantially modified.

The accuracy of the device is guaranteed by the adjustments of the pivot in the oblong port, the parallel alignment of the reference plane with the oblong port and the distance between the pivot and the abutment.

The knurled abutment screw is easily accessible to ensure adjustment when the display device displays a synthetic image to assist in the centering of the eye-box on the eye of the pilot.

The invention claimed is:

1. A helmet-mounted display system comprising a helmet shell and a mechanical arch mounted on a front part of said shell, the mechanical arch comprising:
   a fixed position detection device;
   a display device;
   a means for holding and adjusting the display device in a vertical plane, said holding and adjustment means comprising:
      a first vertical support surface disposed in a front part of the arch and at right angles to a sagittal plane of the shell, said first vertical support surface comprising an oblong port; and
      a screw-spring assembly which ensures fixing and adjustment of the display device on the first vertical support surface, the screw-spring assembly passing through the oblong port and being fixed in a mechanical structure of the display device, the display device being able to rotate with friction about an axis of the screw-spring assembly so as to make it retractable;
   wherein the display system comprises a means for roll adjustment and repositioning of the display device, said adjustment and repositioning means comprising:
      a second vertical support surface, normal to the first vertical support surface;
      a knurled screw with a spherical end attached to the mechanical structure of the display device, an axis of the knurled screw being at right angles to the axis of the screw-spring assembly and in a horizontal plane, the spherical end resting on the second vertical support surface when the display device is in its position of use.

2. The helmet-mounted display system as claimed in claim 1, wherein the mechanical arch comprises an electrical system for detecting contact of the knurled screw with the second vertical support surface.

3. The helmet-mounted display system as claimed in claim 1, wherein the mechanical arch comprises a mechanical system for locking the knurled screw on the second vertical support surface.

4. The helmet-mounted display system as claimed in claim 1, wherein the mechanical arch comprises a magnetization-based system for locking the knurled screw on the second vertical support surface.

5. The helmet-mounted display system as claimed in claim 1, wherein the display device comprises an optical combiner with pupil expansion.

6. The helmet-mounted display system as claimed in claim 1, wherein the position detection device is a camera optical device.

7. The helmet-mounted display system as claimed in claim 1, wherein the helmet-mounted display device comprises a display, the helmet-mounted display system comprises a graphic computer comprising a function for dimensioning a size of image as a function of inclination of the display device when the display device is in its position of use.

8. The helmet-mounted display system as claimed in claim 1, wherein the display system comprises a movable visor mounted on the mechanical arch, said visor covering the display device in lowered position and being situated on top of the shell in raised position.

9. The helmet-mounted display system as claimed in claim 1, wherein the mechanical arch comprises fixing means for a binocular support.

\* \* \* \* \*